Sept. 1, 1964 T. G. KNIGHT 3,147,452
CONSTANT IMPEDANCE VARIABLE DELAY LINE
Filed May 3, 1962
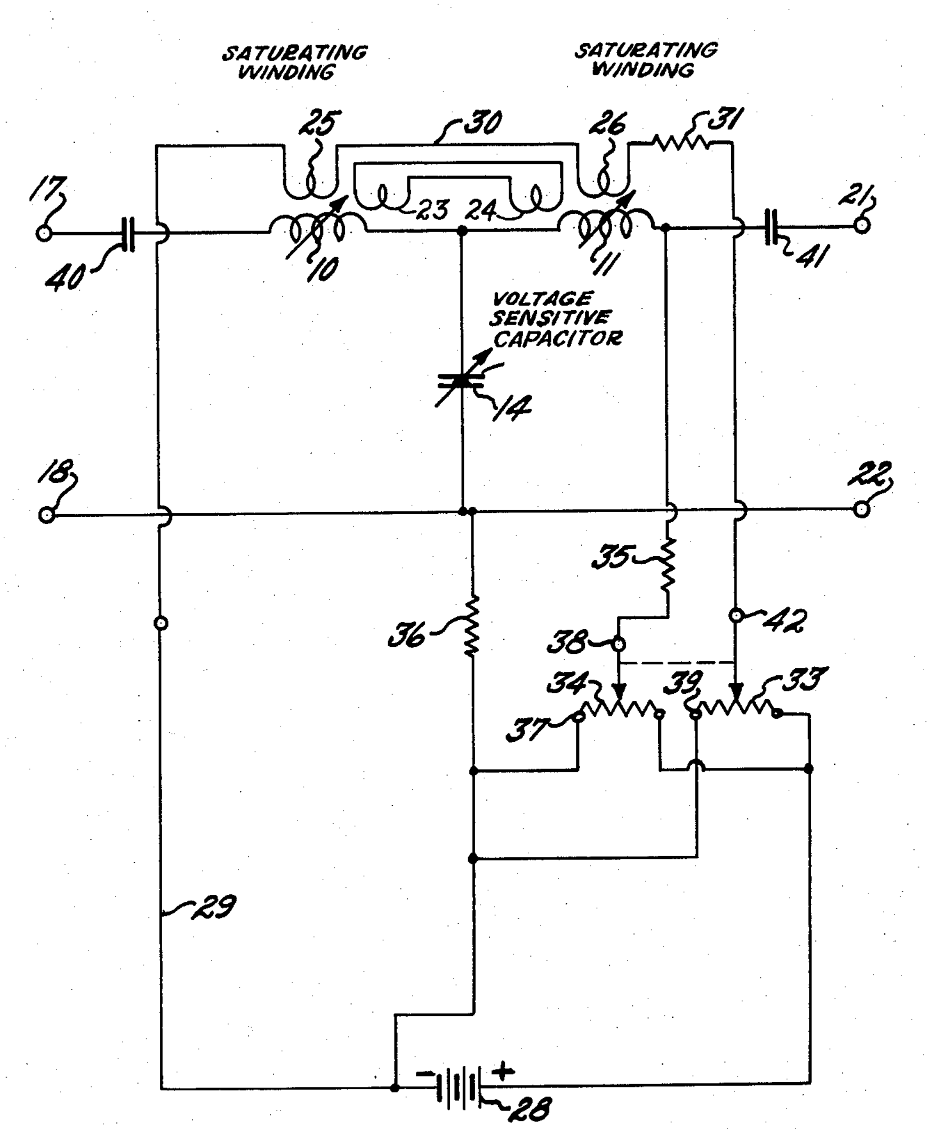
INVENTOR.
THOMAS G. KNIGHT
BY Wade Koontz
George Fine
ATTORNEYS 3,147,452

CONSTANT IMPEDANCE VARIABLE DELAY LINE

Thomas G. Knight, North Reading, Mass., assignor to the United States of America as represented by the Secretary of the Air Force

Filed May 3, 1962, Ser. No. 192,291
1 Claim. (Cl. 333—29)
(Granted under Title 35, U.S. Code (1952), sec. 266)

The invention described herein may be manufactured and used by or for the United States Government for governmental purposes without payment to me of any royalty thereon.

The present invention relates to delay lines, and more particularly electrical lines having the delay thereof continuously variable while retaining the characteristic impedance constant.

In the prior art, there is provided apparatus including inductance and capacitance to delay an electrical signal, passing therethrough, the magnitude of said delay being variable. However, in the prior art, variations of delay invariably included therewith changes in the characteristic impedance introducing problems of impedance mismatch.

The present invention provides a variable delay line having current-sensitive inductances and voltage-sensitive capacitance in combination wherein the amount of delay of said line may be varied while retaining the characteristic impedance constant. Changes in the amount of delay in the line are accomplished by varying the voltage applied across the capacitors and simultaneously varying the current flow through control windings on the inductors. Two potentiometers connected across a common power source and operated together may be utilized to provide the necessary controls for the delay line, the potentiometers being ganged together in such a manner that the capacity and the inductance of the circuit will vary simultaneously in the proper proportions to retain the characteristic impedance of said line constant while varying the amount of delay thereof. If desired, the potentiometer may be replaced by electron discharge devices to which control signals may be applied to vary simultaneously the inductance and capacitance of the delay line.

It is an object of the present invention to provide a variable delay line including inductance and capacitance in combination wherein the characteristic impedance thereof remains constant while the amount of delay thereof is varied.

Another object of the present invention is to provide a variable delay line having voltage-sensitive capacitors and current-sensitive inductors in combination wherein the values of said inductors and capacitors are varied simultaneously while retaining the characteristic impedance of said variable delay line constant.

Still another object of the present invention is to provide a variable delay line having inductance and capacitance in combination and whose values are simultaneously varied electronically while retaining the characteristic impedance of said variable delay line.

Yet another object of the present invention is to provide a continuously variable delay line including inductance and capacitance sections wherein the values of said capacitance and inductance are varied simultaneously, thereby varying the amount of delay in said line while retaining a constant inductance and capacitance ratio.

Still further objects and advantages of the present invention will appear from the more detailed description set forth below, it being understood, however, that such more detailed description is given by way of illustration and explanation only, and not by way of limitation, since various changes therein may be made by those skilled in the art without departing from the scope and spirit of the present invention.

To vary the delay of a lumped constant delay line, keeping constant characteristic impedance, requires increasing LC products while monitoring constant $L/C$ ratios.

This invention accomplishes this by using voltage sensitive capacitors (special silicon diodes) in conjunction with current sensitive inductors to make up the filter sections. The capacity of voltage sensitive capacitors varies (approximately) indirectly as the square root of their impressed inverse voltage, while the inductance of current sensitive inductors varies (proximately) indirectly as the square of current through the control winding. It is then apparent that to keep a constant $L/C$ ratio while increasing both L and C that the current changes through the inductor control winding must vary as the fourth root of the voltage changes across the voltage sensitive capacitors.

Now referring to the single drawing showing the preferred embodiment of the invention, there is shown a single section in which the signal to be delayed is received by input terminals 17 and 18. Capacitor 40 and capacitor 41 are utilized for blocking direct currents and are interconnected by series connected inductances 10 and 11. Inductances 10 and 11 are current sensitive. Capacitor 14 shunts inductances 10 and 11 and is voltage sensitive. Capacitor 14 may be a silicon diode whose capacity varies with voltage. The delayed signal is available at the output terminals 21 and 22. Windings 23 and 24 are interconnected and provide the mutual inductance between inductances 10 and 11. Windings 25 and 26 represent the control current windings for currents sensitive inductances 10 and 11, respectively. The negative side of D.C. battery 28 is connected to winding 25 by line 29. Winding 25 is connected to winding 26 by line 30. Resistor 31 is the control winding resistance of windings 25 and 26 and interconnects winding 26 and the center tap of potentiometer 33. Potentiometer 33 is also connected across battery 28. Potentiometer 34 is also connected across battery 28. Potentiometers 33 and 34 are ganged. The center tap of potentiometer 34 is connected to current sensitive inductance 11 by way of resistor 35 and one end of potentiometer 34 is connected to capacitor 14 by way of resistor 36. Resistors 35 and 36 are A.C. blocking resistors and serve to carry direct current. Potentiometer 34 serves to control the value of capacitor 14 and potentiometer 33 the values of inductances 10 and 11. It is to be noted that potentiometer 33 is non-linear (voltage across points 39 and 42 varies as the fourth root of the voltage across points 37 to 38 of potentiometer 34 for identical degrees and direction of common shaft rotation) i.e., potentiometers 33 and 34 are ganged on the same shaft. Potentiometer 34 is linear (voltage across points 37 and 38 varies linearly with shaft rotation). The current variable inductors may also have a D.C. bias winding.

In operation the amount of delay desired is selected by rotating the common shaft of potentiometers 33 and 34. Assume a larger amount of delay is desired, the shaft of potentiometers 33 and 34 must be rotated clockwise to achieve this. By rotating the shaft clockwise the D.C. voltage across capacitor 14 (points 37 and 38 of potentiometer 34) drops causing an increase in the value of capacitor 14 because the value of capacitor 14 varies inversely as the impressed voltage. Likewise, the voltage across points 39 and 42 of potentiometer 33 decreases causing a corresponding decrease in the current (I) flowing through control windings 25 and 26 of inductances 10 and 11, respectively. This causes the value of inductances 10 and 11 to drop in the same proportion as the value of capacitor 14 decreased, thus keeping the impedance out ($Z_o$) (and $L/C$) constant while increasing LXC giving the desired increase in delay time. Resistors 35 and 36 serve to feed voltage (at essentially no current) to the voltage variable capacitor 14. Capacitors 40 and 41 serve to isolate the D.C. control voltage from the terminating resistances or (impedances) of the delay line section. Resistances 35 and 36 are also high impedances relative to the characteristic impedance of the line so as not to load down (or change) the output impedance ($Z_o$). Resistance 31 is the internal resistance of control windings 25 and 26 and includes any necessary additional resistance that may be necessary to: limit peaks current through windings 25 and 26; secure proper current range through windings 25 and 26; and insure that the voltage across points 39 and 42 of potentiometer 33 varies linearly with the current $I_J$, i.e., the resistance 35 is much greater than the resistance between points 39 and 42 of potentiometer 33.

To couple individual sections together (for multiple section lines and consequently greater delay times) it is only necessary to join the sections in sequence (output of No. 1 to input of No. 2 output of No. 2 to input of No. 3, etc.). The simultaneous control of all sections is then achieved by removing the D.C. blocking capacitors 40 and 41 of all sections so that resistors 35 and 36 feed all variable voltage capacitors through the D.C. path through all the current sensitive inductances. The control current through all the current sensitive inductance control windings is obtained by joining all the control windings in series and decreasing the external portion of resistance 31 or paralleling points 39 and 42, provided the additional current required does not change the voltage output relations of points 39 to 42 of potentiometer 33 vs. shaft position.

The delay time may also be changed by using resistance variable elements (tubes or transistors) to replace potentiometer elements and thus provide completely electronically controlled delay line.

It is also to be noted that the amount of delay may be selected by rotation of the ganged potentiometers by servo-mechanism control for sequential or programmed delays.

What I claim is:

A constant impedance variable delay line comprising a first pair of inductances in series relationship, a capacitance in combination with and shunting said pair of inductances, the magnitude of said capacitance being determined by the magnitude of a voltage applied thereto, a first non-linearily variable source of voltage connected to said capacitance, a pair of input and output terminals for said combination, a second pair of inductances interconnected to each other and positioned adjacent to said first pair of inductances operating to provide mutual inductance between said first pair, a third pair of inductances interconnected to each other and also connected to a second linearily variable source of voltage to control the degree of current flow therethrough, said third pair of inductances also being positioned adjacent to said first pair of inductances to control the magnitude of inductance of said first pair, and mechanical means connecting said first and second voltage sources to permit simultaneous variation thereof.

References Cited in the file of this patent

UNITED STATES PATENTS

| | | |
|---|---|---|
| 2,852,750 | Goldberg | Sept. 16, 1958 |
| 2,891,158 | Gabor | June 16, 1959 |
| 2,907,957 | Dewitz | Oct. 6, 1959 |
| 3,022,472 | Tannenbaum | Feb. 20, 1962 |
| 3,049,589 | Johnson | Aug. 14, 1962 |